(12) United States Patent
Apostolopoulos et al.

(10) Patent No.: US 10,604,901 B1
(45) Date of Patent: Mar. 31, 2020

(54) CABLE-PANEL CONNECTOR FOR BRIDGE PLATFORM OR OTHER SCAFFOLDING

(71) Applicants: Lambros Apostolopoulos, Amherst, NY (US); Paul Apostolopoulos, Amherst, NY (US)

(72) Inventors: Lambros Apostolopoulos, Amherst, NY (US); Paul Apostolopoulos, Amherst, NY (US)

(73) Assignee: Paul Kristen, Inc., Tonawanda, NY (US)

( * ) Notice: Subject to any disclaimer, the term of this patent is extended or adjusted under 35 U.S.C. 154(b) by 0 days.

(21) Appl. No.: 16/360,112

(22) Filed: Mar. 21, 2019

Related U.S. Application Data

(60) Continuation of application No. 15/065,475, filed on Mar. 9, 2016, now Pat. No. 10,266,998, which is a division of application No. 12/884,418, filed on Sep. 17, 2010, now Pat. No. 9,309,633.

(60) Provisional application No. 61/276,972, filed on Sep. 18, 2009.

(51) Int. Cl.
*E01D 19/10* (2006.01)
*F16B 5/00* (2006.01)

(52) U.S. Cl.
CPC ............ *E01D 19/106* (2013.01); *F16B 5/008* (2013.01); *F16B 5/0084* (2013.01); *Y10T 403/32155* (2015.01); *Y10T 403/7015* (2015.01); *Y10T 403/7188* (2015.01)

(58) Field of Classification Search
CPC ......... E01D 19/106; E01D 19/16; E04G 3/28; E04G 3/30; E04G 3/32; E04G 3/325; F16B 5/0012; F16B 5/008; F16B 5/0084; F16B 5/0621; F16B 2005/0678; Y10T 403/32131; Y10T 403/581; Y10T 403/589; Y10T 403/7015; Y10T 403/7188
USPC ....... 403/68, 71, 316, 320, 353, 399; 248/63
See application file for complete search history.

(56) References Cited

U.S. PATENT DOCUMENTS

| 5,730,248 | A   | * | 3/1998  | Apostolopoulos .... E01D 19/106 182/138 |
| 6,227,331 | B1  | * | 5/2001  | Apostolopoulos .... E01D 19/106 182/138 |
| 9,217,451 | B2  |   | 12/2015 | Apostolopoulos et al. |
| 9,309,633 | B2  |   | 4/2016  | Apostolopoulos et al. |
| 10,266,998 | B2 |   | 4/2019  | Apostolopoulos et al. |
| 2008/0313865 | A1 | * | 12/2008 | Hatsios ............... E04G 21/3204 24/135 R |

* cited by examiner

*Primary Examiner* — Josh Skroupa
(74) *Attorney, Agent, or Firm* — James C. Simmons

(57) ABSTRACT

A connector comprises first and second parts having first and second plates respectively. The plates can abut to cover a panel opening and have slots in their abutting edges. The second part has a portion which extends in the second plate slot and which extends beyond the second plate edge a distance defining a neck. An arcuate portion extends from an end of the neck to receive the cable and has a threaded terminal end portion. In a first orientation of the second part, the neck extends vertically below the first plate to allow ease of manipulation of the second part to receive the cable between the arcuate portion and the panel. In a second orientation thereof, the neck extends horizontally within the first plate slot when the second part is in a closed position with the terminal end portion received in an aperture in the first plate.

12 Claims, 12 Drawing Sheets

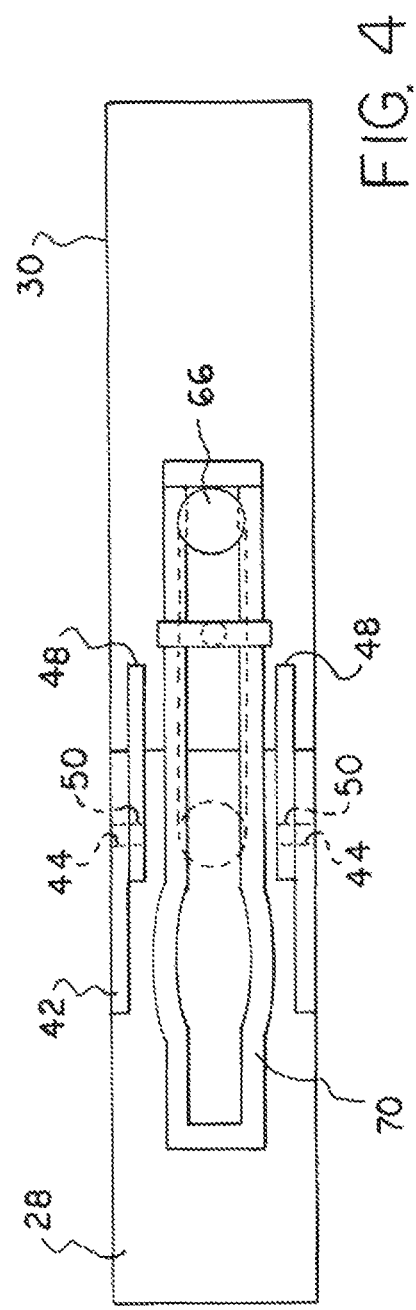
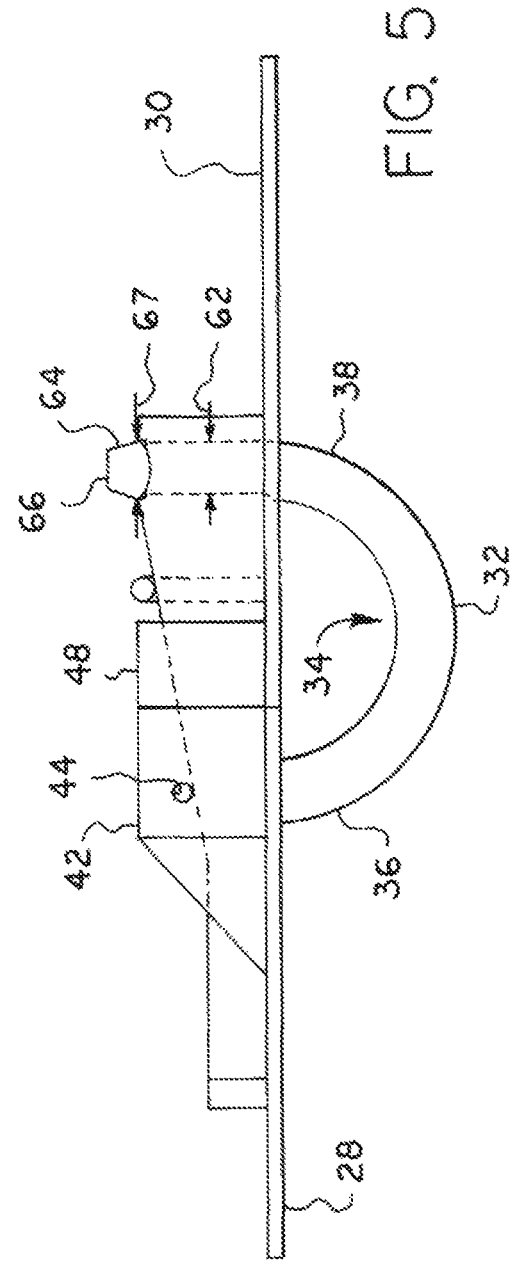

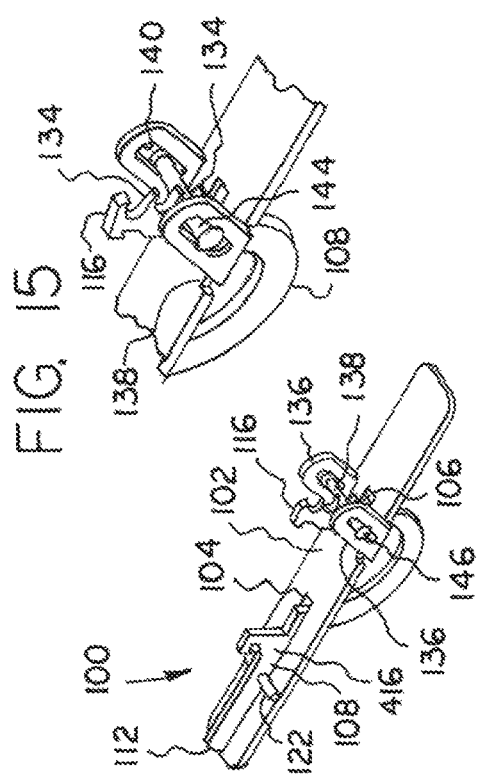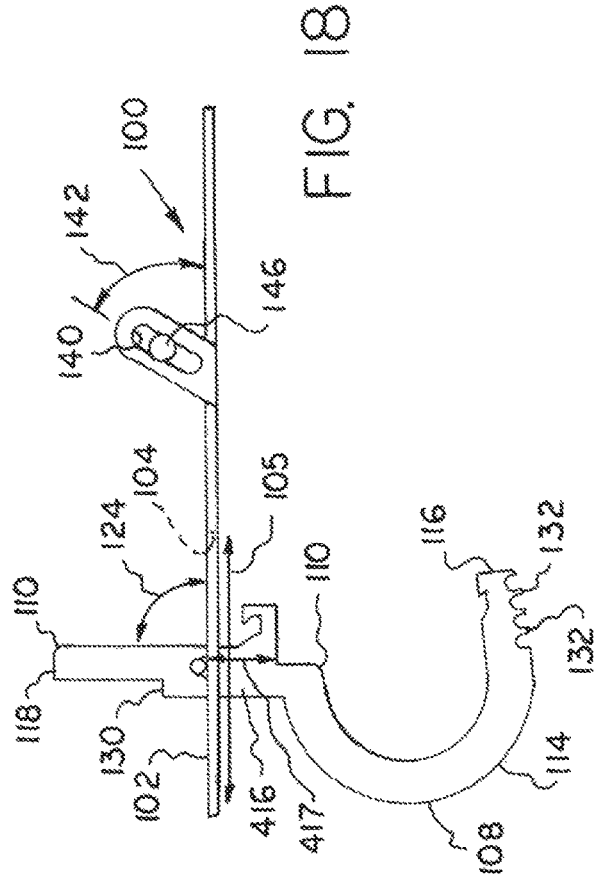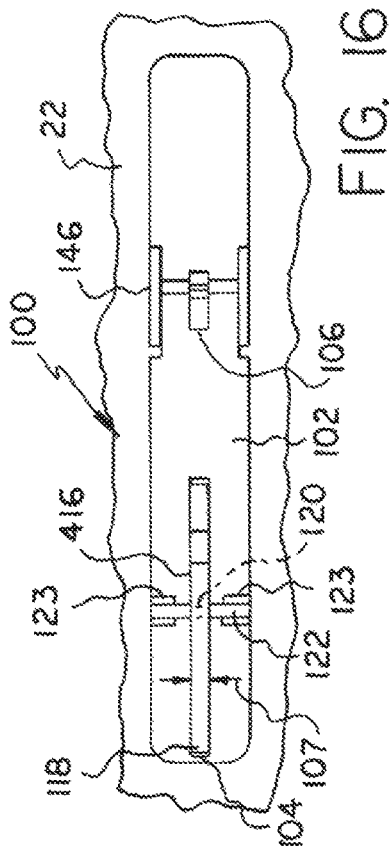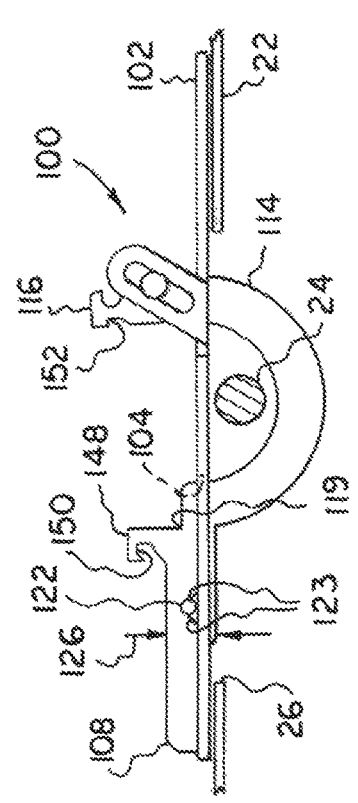

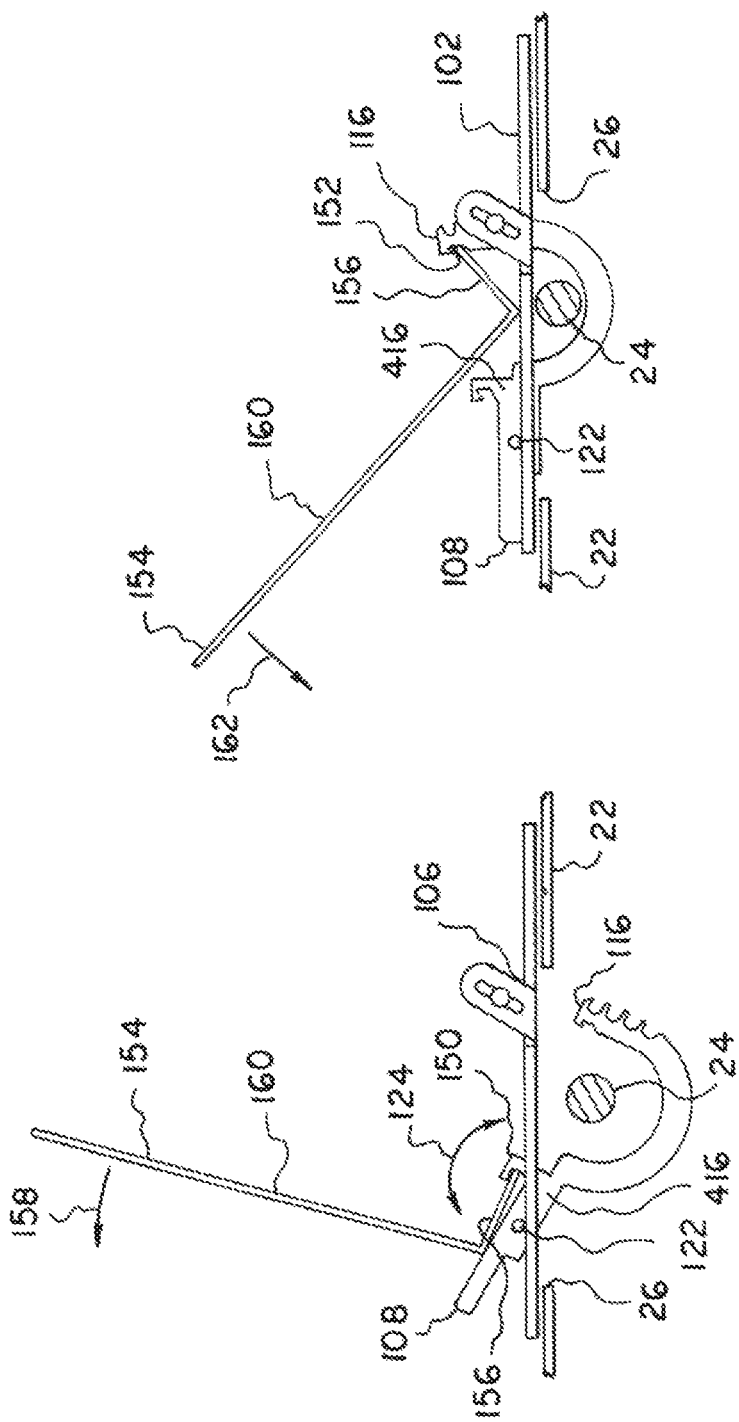

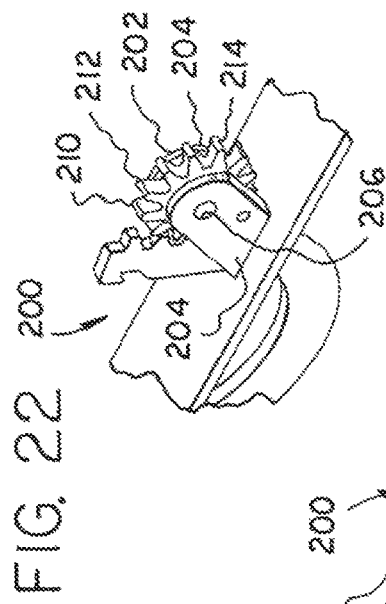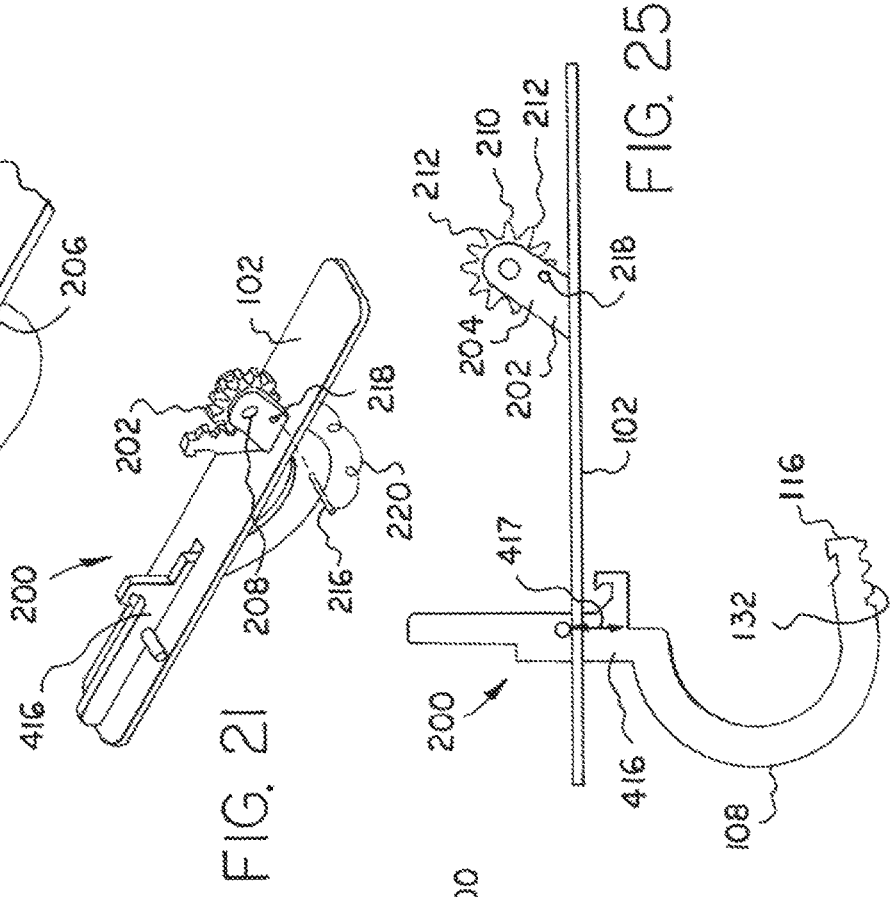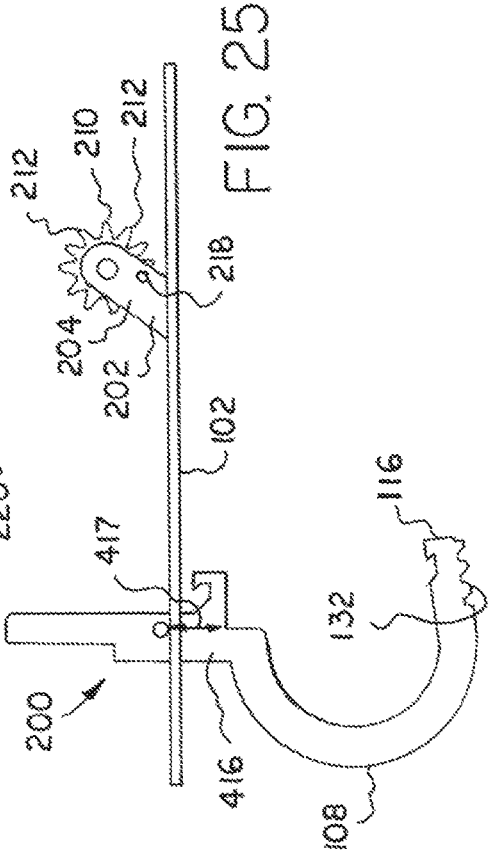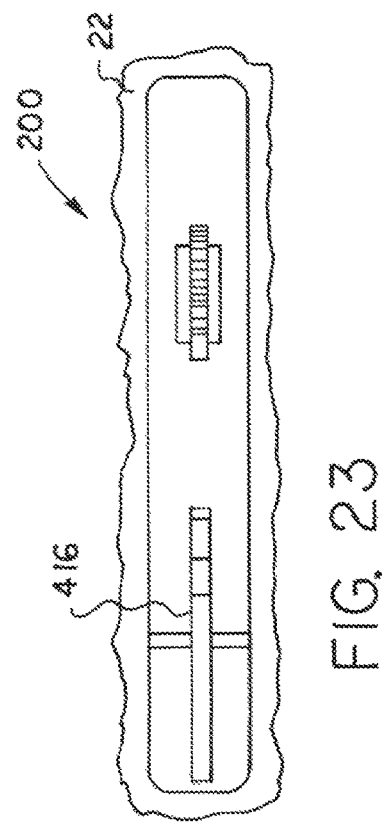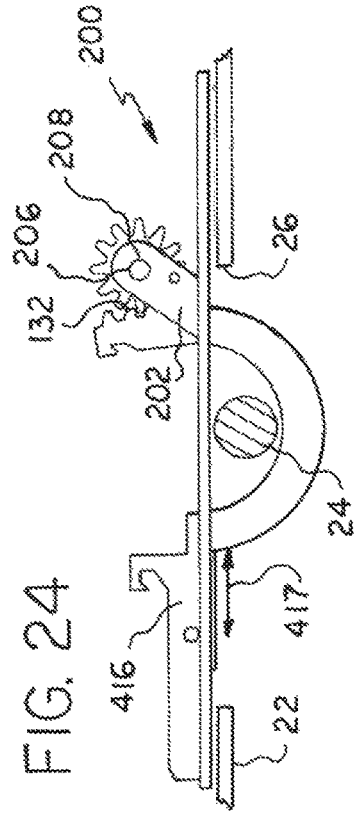

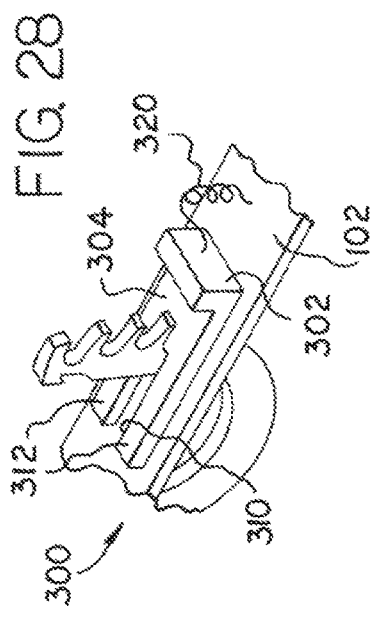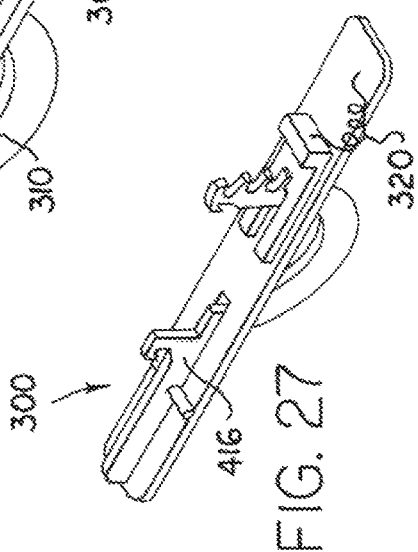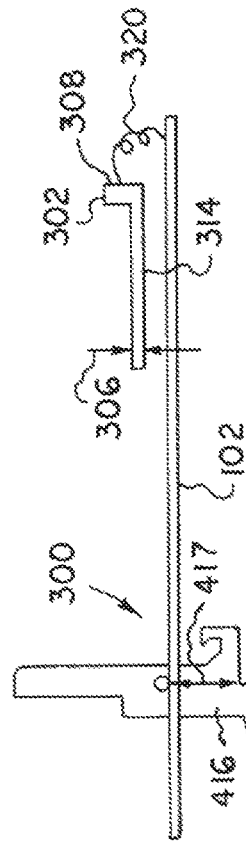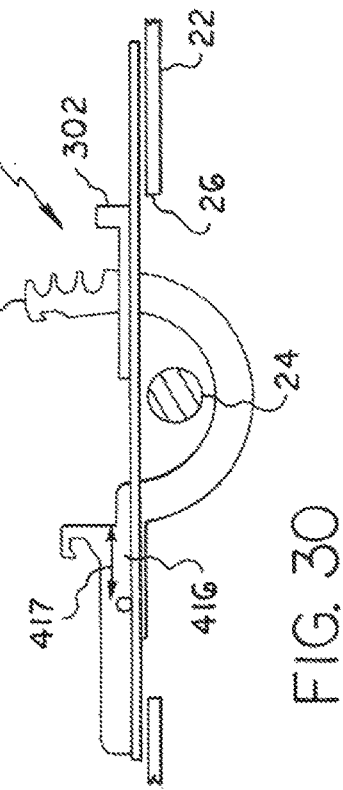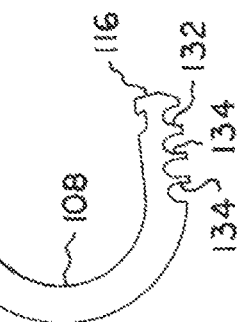

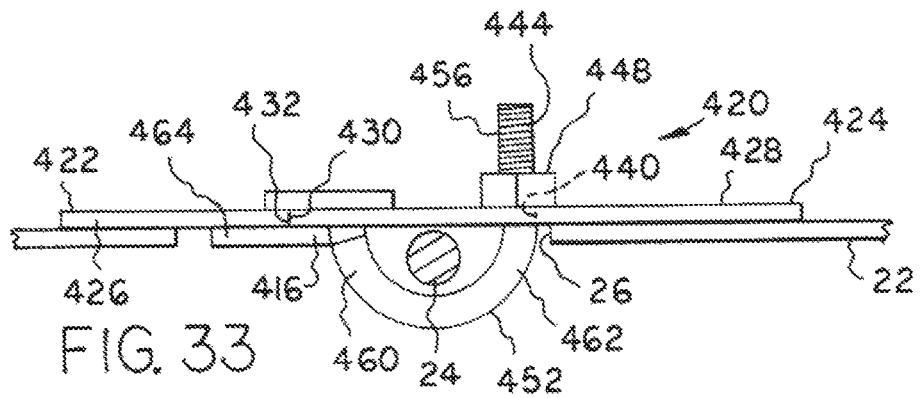
FIG. 33
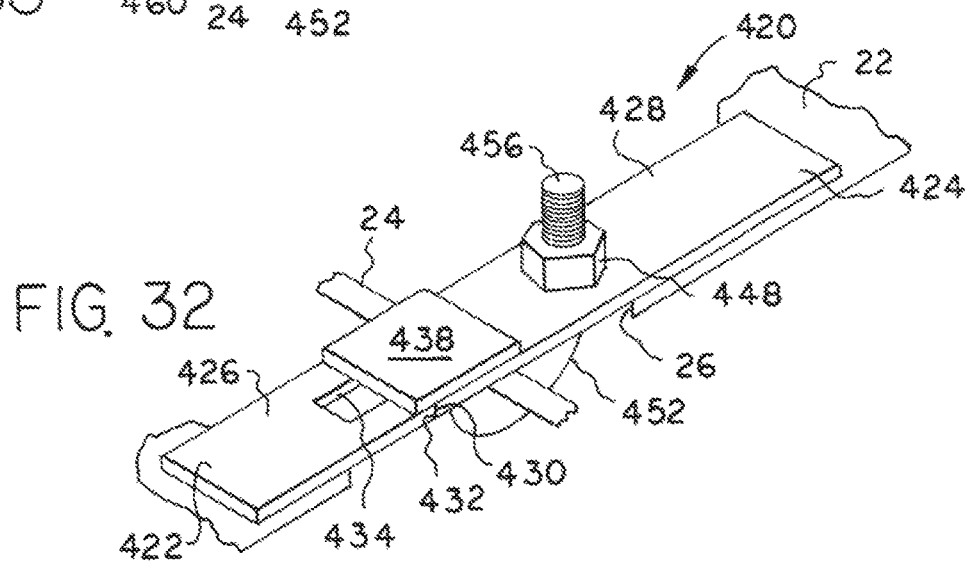
FIG. 32
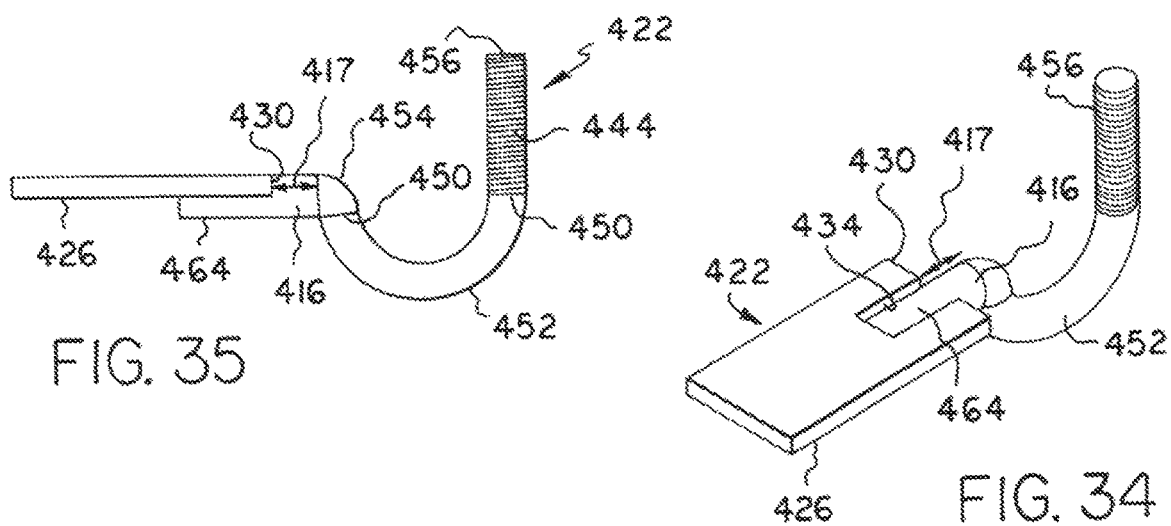
FIG. 35
FIG. 34

CABLE-PANEL CONNECTOR FOR BRIDGE PLATFORM OR OTHER SCAFFOLDING

This is a continuation of application Ser. No. 15/065,475, filed Mar. 9, 2016, which is a divisional of application Ser. No. 12/884,418, filed Sep. 17, 2010, and priority of U.S. provisional patent application Ser. No. 61/276,972, filed Sep. 18, 2009, is claimed, all of which applications are hereby incorporated herein by reference.

The present invention relates generally to bridge platforms or other scaffolding. More particularly, the present invention relates to scaffolding wherein panels are supported by cables which are attached at their ends to bridge or other structure. Such a platform or scaffolding is illustrated in my prior U.S. Pat. Nos. 6,523,644; 6,386,319; 6,302,237; 6,264,002; 6,227,331; 6,138,793; 6,135,240; 6,003,634; 5,921,346; and 5,730,248, all of which are incorporated herein by reference.

Such a platform structure requires that the cables, which pass underneath and support the panels, be securely connected releasably to the panels. One such connector which has served this function well is illustrated, for example, in FIGS. 10 to 15 of my aforesaid U.S. Pat. No. 6,135,240 and in FIGS. 15 to 17 of my aforesaid U.S. Pat. No. 6,523,644, wherein the connector comprises a plate which engages the upper surface of a panel, and a generally U-shaped member which is attached to the plate to extend downwardly therefrom to be received in a panel opening and to receive the cable. The free end of the member is threadedly attached to another plate wherein the two plates generally cover the opening with the cable securely received within (between the legs of) the U-shaped member, as more fully described in my aforesaid U.S. Pat. Nos. 6,135,240 and 6,523,644.

My prior U.S. Pat. No. 6,264,002 (see FIG. 21 thereof) discloses a Panel-cable fastener, which also works well, wherein an arcuate member is received in a panel opening, receives the cable, and bears against the under surface of the panel, and a lever is rotatably connected to the arcuate member to bear against the upper surface of the panel to secure the connection of the cable to the panel.

Other art which may also be of interest includes U.S. Pat. Nos. 5,957,239; 6,568,874; 6,755,590; 6,860,672; 4,348,128; 4,525,096; 5,119,529; 6,948,703; and 5,409,339 all of which along with other patents and published applications discussed herein are incorporated herein by reference.

While the above-discussed connector in my aforesaid U.S. Pat. Nos. 6,135,240 and 6,523,644 has served well, nevertheless when the corners of four overlapping panels 22 are all together being attached to a cable 24, the connector of my aforesaid U.S. Pat. Nos. 6,135,240 and 6,523,644, illustrated at 400 in FIG. 37, affords minimal clearance, as seen in FIG. 37, with the result that it is often difficult to receive the cable 24 within the U-shaped member 402. But the cable must be tightly held necessitating that it not be too large. There thus exists a long-felt need for a panel to cable connector which, while tightly holding a cable attached to a panel, affords greater clearance for more easily achieving the attachment, particularly when it is necessary to attach as many as four overlapping panels to the cable.

It is accordingly an object of the present invention to provide a connector which is easier and quicker to install.

It is a further object of the present invention to provide a connector which is quicker to install.

In order to provide such a connector which is easier to install and thus satisfies the long-felt need, in accordance with the present invention, the U-shaped member is provided with a neck portion to afford greater access to receive the cable, which neck portion is illustrated at 416 in FIGS. 32 to 36 and 38 as well as in other figures of the appended drawings and as more particularly discussed hereinafter.

The above and other objects, features, and advantages of the present invention as well as an appreciation of the long-felt needs out of which the present invention arose will be apparent in the following detailed description of the preferred embodiment(s) thereof when read in conjunction with the accompanying drawings wherein the same reference numerals denote the same or similar parts throughout the several views.

BRIEF DESCRIPTION OF THE DRAWINGS

FIGS. 2 and 3 are elevation and perspective views respectively illustrating a sequence of connecting the cable to the panel.

FIG. 4 is a plan view of the connector as illustrated in FIG. 1.

FIG. 5 is an elevation view of the connector as illustrated in FIG. 1.

FIG. 14 is a perspective view of a connector in accordance with an alternative embodiment of the present invention, illustrated in a closed position.

FIG. 15 is an enlarged partial perspective view of the connector of FIG. 14, illustrated in the closed position.

FIG. 16 is a plan view of the connector of FIG. 14, illustrated in the closed position.

FIG. 17 is a side view of the connector of FIG. 14, illustrated in the closed position attaching a cable to a deck panel.

FIG. 18 is a side view of the connector of FIG. 14, illustrated in an open position.

FIG. 19 is a side view of the connector of FIG. 14, illustrated in an open position and illustrating the use of a tool for manipulating the connector to the closed position in a first step.

FIG. 20 is a side view of the connector of FIG. 14, illustrating the use of the tool for manipulating the connector to the closed position in a second step.

FIGS. 21 to 25 are views similar to those of FIGS. 14 to 18 of a connector in accordance with another embodiment of the present invention.

FIGS. 27 to 31 are views similar to those of FIGS. 14 to 18 of a connector in accordance with yet another embodiment of the present invention.

FIG. 32 is a perspective view of a connector in accordance with another embodiment of the present invention, illustrated in a closed position.

FIG. 33 is a side view of the connector of FIG. 32.

FIG. 34 is a perspective view of a plate (with attached U-shaped member portion) of the connector of FIG. 32.

FIG. 35 is a side view of the plate (with attached U-shaped member portion) of FIG. 34.

DETAILED DESCRIPTION OF THE PREFERRED EMBODIMENTS

Referring to FIGS. 1 to 13, there is illustrated generally at 20 a connector or deck clip composed or steel or other suitable material for connecting a platform panel 22 to an underlying supportive cable 24. It should be understood that the panel 22 is one of a series of panels laid side-by-side and/or end-to-end to form a platform for conducting maintenance work on a bridge or to otherwise form a scaffolding platform, and the cable 24 is one of a series of parallel cables which underlie and support the panels 22 and the ends of which are secured to portions of the bridge or other structural portions or otherwise suitably secured, as described in more detail in my aforesaid patents. One or more openings or slots, one illustrated at 26, are provided in the panel 22 for use in connecting the panel 22 to the cable 24, as will be described in greater detail hereinafter.

Figure 1:
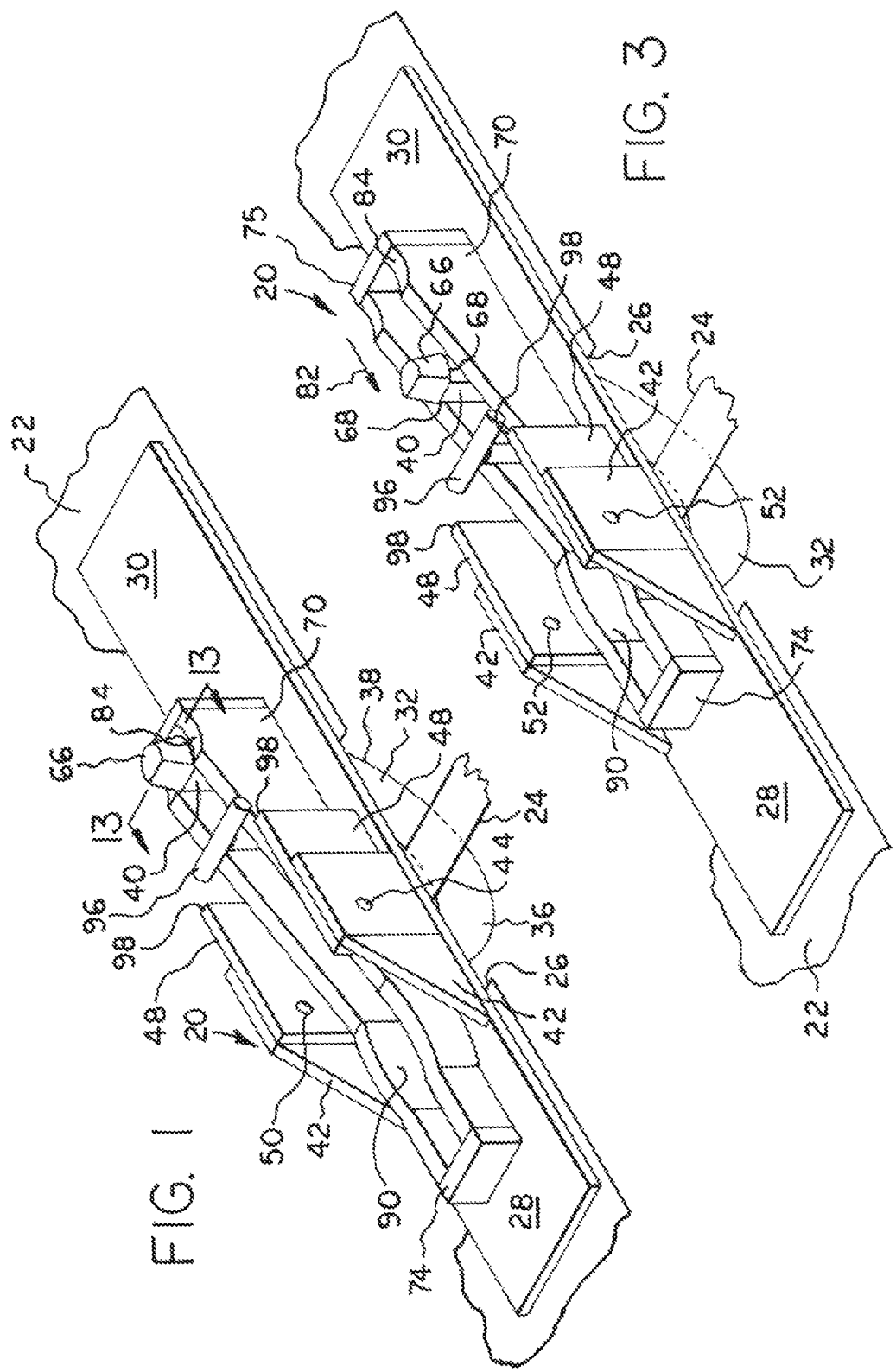
FIG. 1 is a perspective view of a connector, which embodies the present invention, connecting a supportive cable to a panel of a platform.
Figure 2:
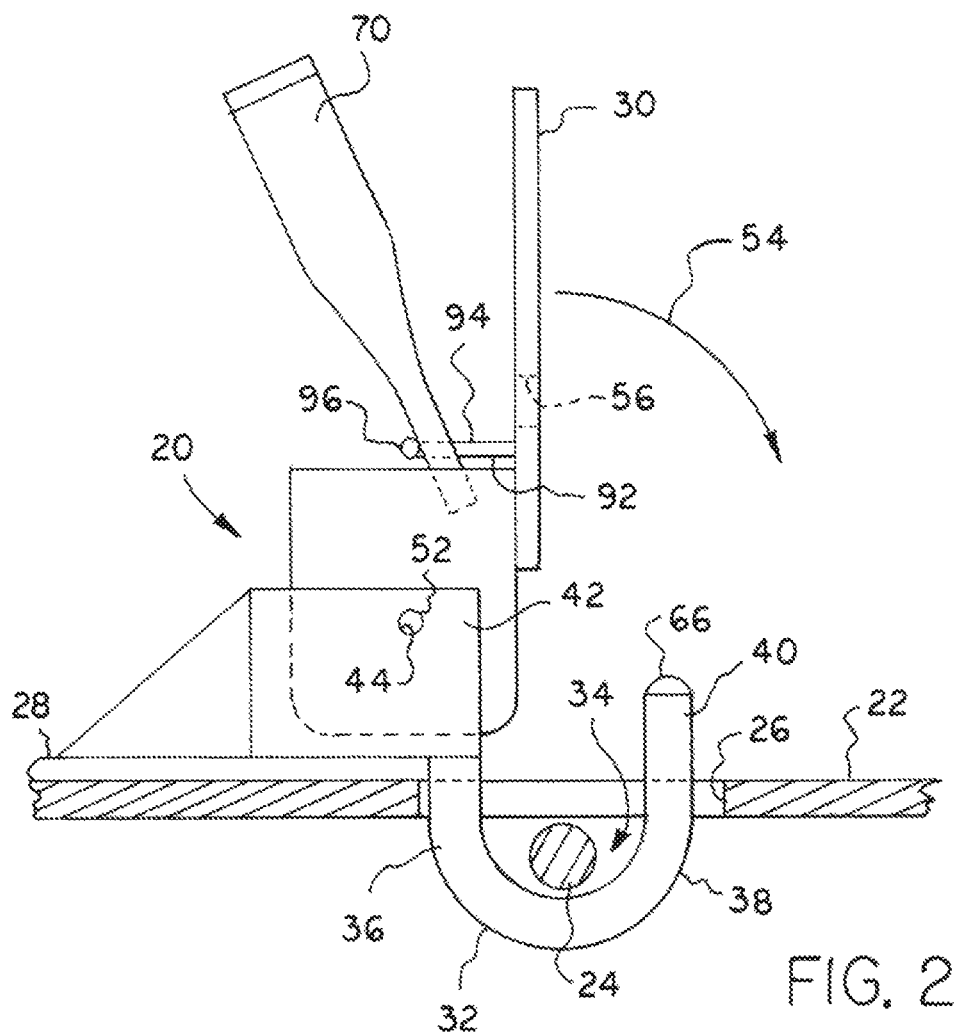
Figure 6:
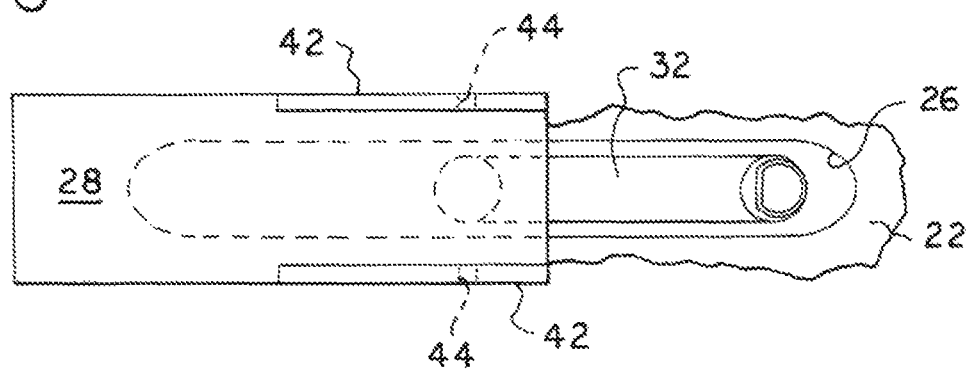
FIG. 6 is a plan view of a first plate and attached generally U-shaped member of the connector.
Figure 7:
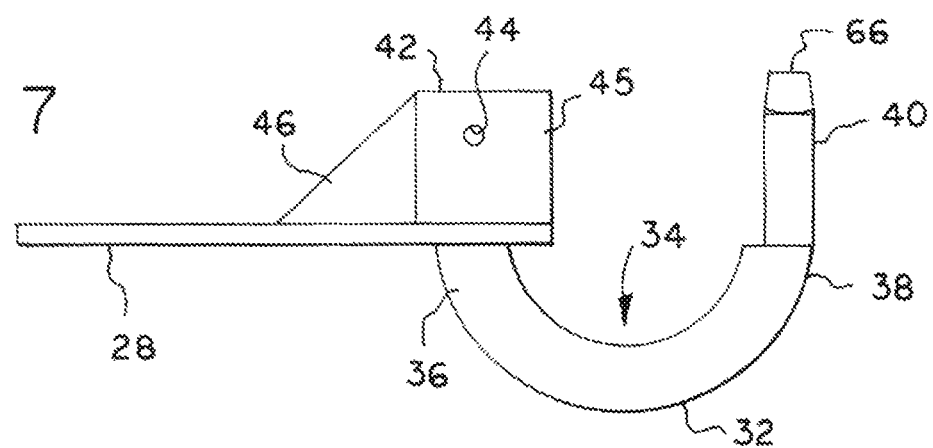
FIG. 7 is an elevation view of the first plate and attached generally U-shaped member.
Figure 8:
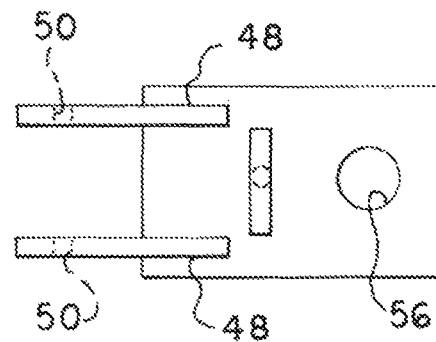
FIG. 8 is a plan view of a second plate (including attachments thereto) of the connector.
Figure 9:
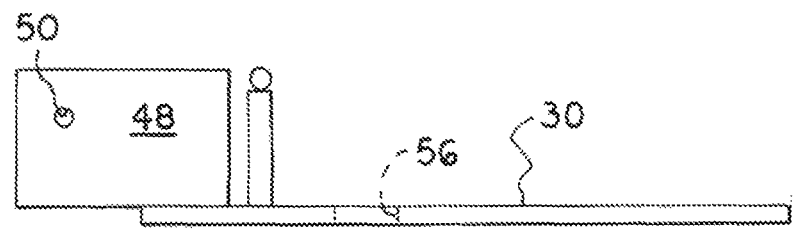
FIG. 9 is an elevation view of the second plate (including attachments thereto).

The connector 20 includes first and second plates 28 and 30 respectively which are sized to together overlie and extend beyond the slot 26 lengthwise, as illustrated in FIGS. 1 to 3. A generally U-shaped or generally arcuate (or otherwise suitably shaped) member 32 is welded or otherwise suitably attached to the first plate 28 to be received within the slot 26 for receiving the cable 24 in the cradle, illustrated at 34, between the legs 36 and 38 thereof, the leg 36 being the one which is attached to the first plate 28. Since the panel 22 may overlap with 1 to 3 other panels, there may be from 1 to 4 such slots 26 in which the member 32 is received for attaching 1 to 4 panels 22 respectively to the cable 24, only one such slot 26 being illustrated for ease of illustration. The slot 26 is sized to allow the U-shaped member 32 to be manipulated into position with the leg 38 extending below the panel 22 suitably to allow the underlying cable 24 to be received within the cradle 34 and then, as illustrated in FIG. 2, to allow the terminal end portion 40 to extend above the panel 22 in position for securing the connector with the cable 24 securely received between the cradle 34 and the one or both of the plates 28 and 30 (for example, as illustrated, between the cradle 34 and the second plate 30).

A pair of vertical plates 42 are welded or otherwise suitably attached to the first plate 28 (i.e., normal to the first plate 28) along the lateral edges thereof and adjacent the end which faces the second plate 30. As illustrated, each of the plates 42 is shown to comprise two plates 45 and 46 welded together, but may suitably comprise a single plate. By "horizontal" and "vertical," as used herein and in the claims, is meant orientation with reference to the normal position of the connector when connecting a cable to a panel as shown in FIG. 1 with the plates 28 and 30 lying horizontally on the horizontally disposed panel 22. The plates 42 have aligned (coaxial) apertures, illustrated at 44.

A pair of vertical plates 48 are welded or otherwise suitably attached to the second plate 30 (i.e., normal to the second plate 30) spaced inwardly from the lateral edges thereof by a distance equal approximately to the width of the respective vertical plate 42 and adjacent and extending beyond the end which faces the first plate 28 so as to lie in an overlapping relation therewith. The plates 48, similarly as plates 42, have aligned (coaxial) apertures, illustrated at 50.

On each side of the connector 20, a hinge pin 52 is suitably received in the respective aperture 44 and the respective aperture 50 to thereby hingedly connect the first and second plates 28 and 30 thus allowing hinged movement of plate 30 with respect to plate 28, as illustrated at 54 in FIG. 2, from its position illustrated in FIG. 2 to its position illustrated in FIGS. 1 and 3. It should be understood that the plates 28 and 30 may be otherwise suitably hingedly connected.

The slot 26 is suitably sized to allow the position of the U-shaped member 32 to be suitably manipulated to a position of the terminal end portion 40 below the panel 22 suitably to receive the cable 24 within the cradle 34 followed by raising the terminal end portion 40 so that it extends above the panel 22. In order to achieve this manipulation, for example, the connector plates 28 and 30 may each have a width of about 1½ inches and a thickness of about ⅛ inch, the slot 26 may have a width of about ¾ inch and a length of about 6 inches, and the connector plates 28 and 30 may have lengths of, for example, about 5 inches and about 4⅛ inches respectively. Although the slot 26 appears schematically in FIGS. 1 and 3 as well as in other FIGS. herein to extend width-wise beyond edges of the plates 28 and 30 (or other plates) for ease of illustration, the position width-wise of the slot 26 is more clearly shown in FIG. 6. Once the cable 24 is received in the cradle 34 and the terminal end portion 40 manipulated to the position illustrated in FIGS. 1 to 3 wherein it extends above the panel 22, the second plate 30 is hingedly swung downwardly, as illustrated at 54, and the terminal end portion 40 caused to be received in an aperture, illustrated at 56, suitably positioned in the second plate 30, the second plate 30 being positioned co-planar with first plate 28 to rest on the panel 22 and together overlie the slot 26 longitudinally as well as completely or partially overlying the slot 26 laterally or width-wise. The adjacent end edges of the plates 28 and 30 meet or engage each other to prevent further movement of the plate 30 in the direction 54 relative to the plate 28.

Figure 13:
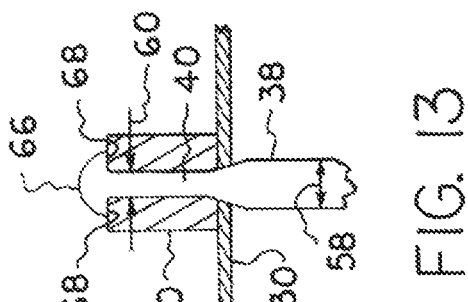
FIG. 13 is a sectional view of the connector taken along lines 13-13 in FIG. 1.
Figure 12:
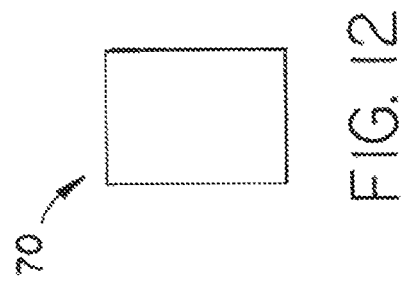
FIG. 12 is an end view of the wedge, taken along lines 12-12 of FIG. 11.
Figure 10:
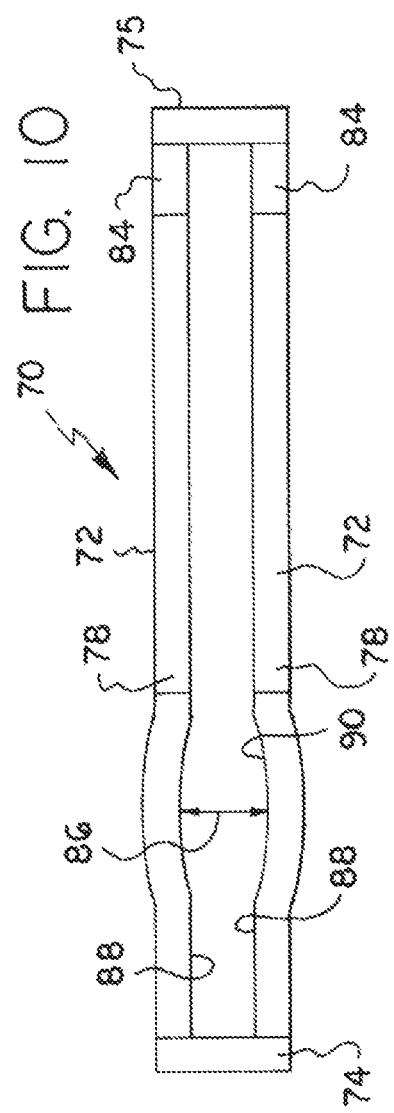
FIG. 10 is a plan view of a wedge for the connector.
Figure 11:
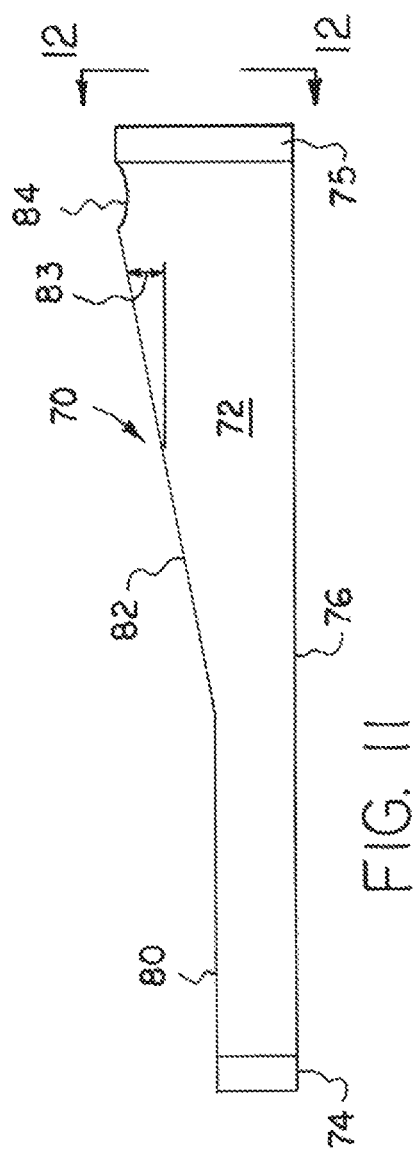
FIG. 11 is an elevation view of the wedge.

The U-shaped portion 32, except as specified hereinafter, is generally circular, having a diameter, illustrated at 58 in FIG. 13, which is, for example, about ½ inch. The cross-sectional dimensions are reduced so that terminal end portion 40 has a generally rectangular cross-section, the width laterally, illustrated at 60 in FIG. 13, being, for example, about ¼ inch, and the width longitudinally, illustrated at 62 in FIG. 5, being, for example, about ⅜ inch. The terminal end portion 40 terminates in a generally circular (with the side tapered, as illustrated at 64 in FIG. 5) cap portion 66 whose diameter, illustrated at 67 in FIG. 5, is equal approximately to the width 62, thus providing lateral overhanging ledges 68 having a width of, for example, about ¹⁄₁₆ inch.

Referring to FIGS. 1 and 3, the U-shaped portion 32 is secured in position by a wedge 70 comprising a pair of elongate generally parallel walls 72 joined by end walls 74 and 75 at their ends respectively by welding or by other suitable means and having a width to allow its receipt with substantial clearance between the vertical plates 48, as seen in FIG. 4. The bottom surfaces (which engage or lie on the plates 28 and 30), illustrated at 76 for walls 72, are flat. The upper surfaces 78 of the walls 72 are similarly tapered as follows. An end portion 80 of each of the surfaces 78 is generally flat, and the other end portion 82 of each of the surfaces 78 is tapered upwardly (the walls 72 are tapered upwardly so that height of the wedge 70 increases, at an angle, illustrated at 83 in FIG. 11 of, for example, about 12 degrees) over the distance from the flat portion 80 to the end thereof (with the surfaces 78 becoming flatter near the wedge end. The walls 72 are spaced, for example, about ⅝₁₆ inch, to receive the terminal end portion 40 therebetween while also being able to engage the ledges 68. As the wedge 70 is moved in the direction illustrated at 82 in FIG. 3 to its position as illustrated in FIG. 1, it more and more tightly wedges between the ledges 68 and the plate 30 to tightly hold the terminal end portion 40 in position. At the end of the wedge, the cap portion 66 is received in recesses, illustrated at 84, in the surfaces 78 to lock the wedge in the wedged position.

The distance, illustrated at 86, between the facing inner surfaces 88 of the portion of the wedge 70 containing the flat surface portions 80 is enlarged to, for example, about ½ inch to provide an opening 90 sufficiently large to allow the wedge 70 to be removed from the terminal end portion 40, as seen in FIG. 2, to permit the hinged movement 54 of the second plate 30 relative to the first plate 28. It should be understood that the wedge 70 may be otherwise suitably sized and shaped to achieve the desired wedging effect.

As a safeguard, the wedge 70 is provided to generally retain the position of the terminal end portion 40 as long as the terminal end portion 40 is not removed through the opening 90. Thus, the wedge 70 is provided to generally retain the terminal end portion 40 position when in the position shown in FIGS. 1 and 3.

When erecting or dismantling platforms, it is considered desirable not to allow connector components to be able to become separated from each other. In order to prevent the wedge 70 from becoming separated, as seen in FIG. 2, a T-shaped member 92 having a rod-shaped portion 94 is preferably welded (or otherwise suitably attached such as by a tight threaded connection) to the second plate 30 generally centrally thereof to extend upwardly therefrom and the central portion of a cross member 96 (also rod-shaped) preferably welded (or otherwise suitably attached such as by a tight threaded connection) to the upper end of the portion 94 to extend laterally of the connector 20 between the upper end corners, illustrated at 98, and closely adjacent thereto to. Thus, as apparent from FIGS. 1 to 3, while the wedge 70 may not be attached or even touch the rest of the connector assembly 20, it nevertheless is inseparable therefrom during normal use of attaching and detaching the panel 22 from the cable 24, although it may of course be separated therefrom by the use of extraordinary efforts, such as by cutting or otherwise dismantling the T-shaped member 92 from the connector, for other purposes such as maintenance or repair. Thus, while the wedge 70 is detachable from and may not even touch the terminal end portion 40 and the remainder of the connector assembly 20, it nevertheless is not inseparable therefrom during normal use of the connector 20 since it cannot be moved away from close proximity thereto. Moreover, it can be seen that all of the other connector parts are also inseparable from each other, although they may also be disassembled for purposes such as maintenance or repair.

As used herein and in the claims, the terms "attached" and "attachable," or variants thereof, with respect to two or more parts, refer to and are defined as a fastening of the parts in such a manner that they are fixed firmly in direct contact with each other. As used herein and in the claims, the term "inseparable," or variants thereof, with respect to two or more parts, is defined as parts which, during normal use for their intended purpose, cannot be parted from close proximity to each other, whether or not they are attached or attachable or in contact or touching each other. The term "connected," or variants thereof, has the normal meaning as defined in a dictionary. Thus, in accordance with the above definitions, two or more parts may be detachably attached during normal use but not be inseparable, and two or more parts may be inseparable but not be attached, and two or more parts may be both detachably attachable and inseparable. Also in accordance with the above definitions, two or more parts may be assembled to be inseparable and disassembled to be separated, and while they are assembled to be inseparable while being used for their intended purpose, they are inseparable, as that term is defined, even though they may later be disassembled to be separated for other purposes such as for maintenance or repair. For example, a pair of rings may be inseparable in that each passes within the other, yet the rings are unattached (as that term is used herein) in that the rings are not fixed firmly in direct contact with each other (they may or may not be in contact with each other). Thus, as is apparent from FIGS. 1 to 3, the wedge 70 may be positioned so as not to touch any of the parts which constitute the rest of the connector 20 (i.e., unattached thereto) yet be inseparable therefrom.

In order to connect the panel 22 to the cable 24, with the second plate 30 hingedly moved to the position shown in FIG. 2, the first plate 28 is manipulated to effect passage of the U-shaped member 32 into the slot 26 and receipt of the cable 24 in the cradle 34, then the second plate 30 is hingedly moved, as illustrated at 54 in FIG. 2, and the terminal end portion 40 received in passage 90 and between the wedge walls 72. The wedge 70 is then moved in the direction illustrated in 68 in FIG. 3 to wedge the wedge 70 between the ledges 68 and the second plate 30. In order to lock the wedge 70 in position, the wedge is positioned as in FIG. 3, and the wedge end wall 75 may be tapped with a hammer to position the ledges 68 in the recesses 84. In order to dismantle the connector 20, the other end wall 74 is tapped with a hammer and the wedge 70 manipulated to remove it from the terminal end portion 40 by passing the terminal end portion 40 through the opening 90, then the second member moved as illustrated at 54 to the position shown in FIG. 2 after which the first plate may be manipulated to remove the cable 24 and thereafter remove the connector 20 from the opening 26. This can all be done easily and quickly. Since all of the connector parts including the wedge 70 are inseparable from each other, this can all be done without fear of losing any connector parts.

Figure 37:
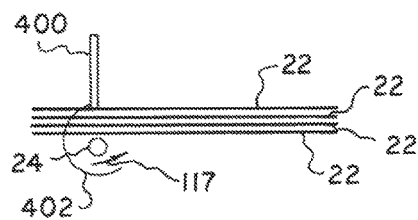
FIG. 37 is a schematic view of a prior art connector in the process of attaching a cable to four deck panels.
Figure 38:
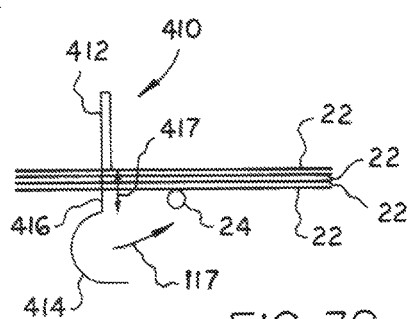
FIG. 38 is a schematic view of the connector in accordance with the present invention (FIGS. 14 to 36) in the process of attaching a cable to four deck panels.

Referring to FIG. 38, there is illustrated at 410 a connector member having a portion 412 and a U-shaped or generally arcuate portion 414. The portion 414 is provided to extend (be translated) through the slots (not shown in FIG. 38) in four deck panels 22 and to be swung around as illustrated at 117 to receive the cable 24 therein for attachment of the cable 24 to the panels 22 as more particularly discussed hereinafter with respect to FIGS. 14 to 36. In order to provide greater access of the U-shaped portion 414 to the cable 24 for easier as well as quicker attachment, in accordance with the present invention, the connector member 410 is provided with a neck portion, illustrated at 416 in the embodiments thereof in FIGS. 14 to 31 as well as generically in FIG. 38 and at 516 in the embodiment of FIGS. 31 to 36. The greater access of U-shaped portion 414 (452 in FIG. 31 to 36 or 114) with the neck portion 416 (516 in FIGS. 31 to 36) to the cable is best seen when comparing the access provided by the generic connector embodiment 410 of FIG. 38 with the neck portion 416 with the lesser access provided by the prior art connector embodiment 400 and 402 of FIG. 37 without such a neck portion. Thus, the neck portion 416, having the length illustrated at 417, is provided to suspend the U-shaped portion 414 at the increased distance 417 below the deck panels 22 so that easier and quicker manipulation of the connector to effect connection of the cable 24 may be achieved.

The distance, illustrated at 417 in FIGS. 18 and 38 (as well as in FIGS. 24, 25, 30, 31, and 35 for other embodiments), defines the neck portion 416 which, as previously discussed, is provided to afford greater access to the cable 24 for more easily and quickly connecting it to the panel or panels 22. The neck portion 416 is provided to suspend the U-shaped portion at a distance below the deck panels so that such greater access may be achieved. This distance or neck portion length 417 can be as long as is needed to provide suitable access, such as about 1 inch, for example, about ½ inch. Preferably, the neck has a round (rather than flat) cross-section, which is stronger. For the purposes of this specification and the claims, a "neck portion" is defined as a portion which attaches the arcuate portion which receives a cable to the portion which remains lying along or over the panel and which is passable through a slot in another part or plate overlying the panel to increase the distance below the another part or plate to which the arcuate portion is suspended and which lies along or over the panel when the cable has been attached. Thus, the neck portion is generally perpendicular to the arcuate portion leg to which it is attached and extends from an edge of the other portion to which it is attached in a direction length-wise of the other portion, as seen at 417 in FIG. 35, and this is meant to be the length-wise direction even if the portion 426 is shortened from the length shown in FIG. 35 so that its length becomes its width. The neck portion 416 has a thickness or diameter which is preferably substantially equal to or less (but may be larger) than the corresponding thickness or diameter of the U-shaped portion to which it is attached. For the purposes of this specification and the claims, a "U-shaped" portion is defined as a portion of a structure which is arcuately formed or otherwise formed to, as a portion of the structure, be able to extend from the level of a deck panel downwardly then upwardly to the level of the deck panel in a manner to be able to receive a cable within the U-shaped portion (or between downwardly and upwardly extending legs thereof) for connecting of the cable to the deck panel.

Referring to FIGS. 14 to 20, there is shown generally at 100 a connector in accordance with an alternative embodiment, which includes the neck portion 416. Unless otherwise specified herein, the parts of the connector 100 as well as connector 20 are composed of steel or other suitable material. The connector 100 includes a first part 102 in the form of a generally flat rectangular plate desirably rounded at the corners and sized to lie on and engage the top of a panel 22 to which a supporting cable 24 is attached or to be attached and to cover or partially cover an opening 26 in the panel 22 which is used to make the connection. The plate 102 has two longitudinally spaced slots or openings, illustrated at 104 and 106, whose purposes will be hereinafter described. It will be apparent that an embodiment can be envisioned wherein a long slot may be provided which includes both of these slots 104 and 106. Accordingly, these slots 104 and 106 as well as other similar pairs of slots or apertures disclosed herein are collectively referred to herein and in the claims as slot means.

Connector 100 also includes a second part 108 in the form of a generally flat plate, desirably rounded as suitable at corners such as at 110, which is received in slot 104 to lie generally normal to plate 102. The plate 108 has a generally rectangular first portion 112, the neck portion 416 (defined by distance 417 in FIG. 18) and a generally arcuate, U-shaped, or otherwise suitably shaped second portion 114 extending from an end of neck portion 416 and terminating in a terminal free end portion 116. The planes of planar plates 102 and 108 are seen (best seen in FIG. 14) as being normal to each other. As hereinafter, a pivot connection, illustrated at 122, of the plates 102 and 108 defines an end of the first portion 112 and beginning of the neck portion 416, the pivot connection 122 allowing the neck portion 416 to pivotally extend below the first plate 102 as best seen in FIG. 18, thereby suspending the arcuate portion 114 by the distance 417 so that the cable 24 may be more easily received or cradled by the arcuate portion 114 for easier attachment of the panel or panels 22 to the cable 24.

The first portion 112 is sized so that its terminal end portion 118 extends beyond the respective end of the slot 104 so that it rests on the plate 102 when the connector 100 is in the closed position illustrated in FIGS. 14 to 17. Material may be selectively removed as at 119 or otherwise as appropriate to lighten the connector.

These plates or parts 102 and 108 are detachably attachable to each other, as discussed hereinafter, to attach the panel 22 to the underlying supporting cable 24. However, it is considered desirable that the parts 102 and 108 (as well as any other parts making up the connector) not become separated/lost from each other when they are detached. In order to make all of the connector 100 (especially the essential parts thereof) self-contained, i.e., wherein all of the needed or essential parts and especially parts 102 and 108 remain together (even while they are detached) so that they are not lost, the parts 102 and 108 are assembled so that they are inseparable, and other parts discussed hereinafter are also preferably inseparable from the connector 100, during their normal use of attaching and detaching the panel 22 from the cable 24, as discussed hereinafter.

Longitudinally spaced from the end portion 118 is an aperture, illustrated at 120, in the first portion 112 in which is received a cylindrical pin 122 which thusly extends normal to the first portion 112 so that it can lie on and engage the plate 102. The pin 122 is welded as by welds 123 (illustrated in only some of the drawings) to the first plate 102 or otherwise suitably attached thereto. For example, the pin 122 may be alternatively attached to plate 102 by a mounting bracket on each side of the slot 104 and by cotter pins to be received in end portions of the pin 122 to retain the pin 122 fixedly attached, but wherein it is removable for purposes of repair or maintenance, though not removable during normal use of the connector 100. The pin 122 thus generally serves as a fulcrum or pivotal attachment for rotation or pivoting of the second plate 108 thereabout, as illustrated at 124 in FIGS. 18 and 19. The slots 104 and 106 are preferably located centrally or midway between the sides of the first plate 102 (but may otherwise be located suitably intermediate thereof), and the pin length is preferably about the same as the width of the first plate 102 and preferably received in the aperture 120 so that it extends across the width of the first plate 102 so that it suitably supports the second plate 108 thereon.

The pin 122 is received preferably centrally of the width, illustrated at 126, of the first portion 112, and the width 126 is preferably such as to allow a portion 128 of the first portion 112 to be received within the slot 104 and extend slightly below the slot 104 when the connector 100 is in a closed position, as illustrated in FIG. 17, to thereby add stability to the connector 100 when in the closed position. A notch, illustrated at 130, is preferably provided in the lower edge of the terminal end portion 118 to allow the terminal end portion 118 to rest on the upper surface of the first plate 102 when the connector 100 is in the closed position.

Figure 26:
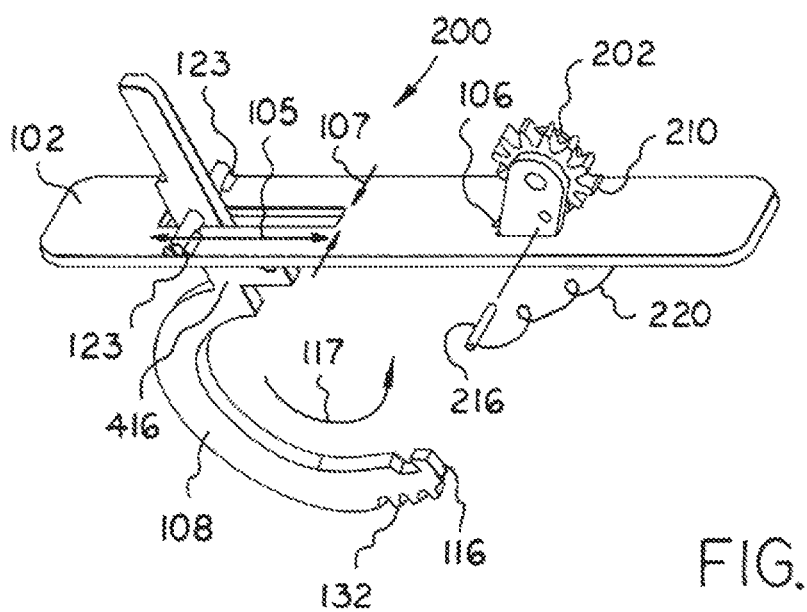
FIG. 26 is a perspective view of the connector of FIGS. 21 to 25, shown in an open position.
Figure 36:
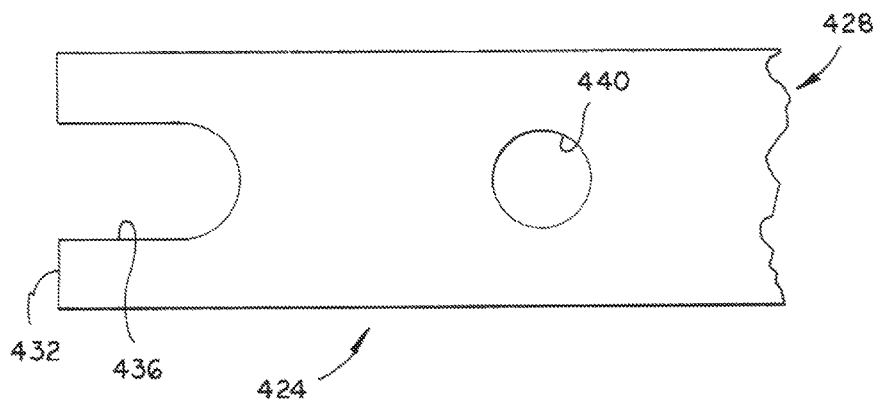
FIG. 36 is a plan view of another plate of the connector of FIG. 32.

The length and width, illustrated at 105 and 107 respectively in FIGS. 16, 18, and 26, of the slot 104 are, for example, about 2¼ and ³⁄₁₆ inches respectively.

The second plate 108 is suitably shaped so that, when the connector 100 is in the closed position illustrated in FIG. 17, the arcuate or U-shaped or otherwise suitably shaped second portion 114, having preferably a uniform width as well as thickness, extends downwardly from the first portion 112 below the first plate 102 then upwardly with the terminal end portion 116 thereof extending through the slot 106, thereby to connectively capture the cable 24, as illustrated in FIG. 17.

The terminal free end portion 116 has a plurality of, for example, 4 longitudinally spaced grooves or indents or slots or cutouts, illustrated at 132, in its outer edge adjacent its terminal end which define a plurality of, for example, 3 longitudinally spaced teeth 134.

A pair of upstanding outwardly sloping generally flat members 136 are welded or otherwise suitably attached to the first plate 102 with their lower edge portions received in recesses, illustrated at 138, in the longitudinal edges of the plate 102. Each of these members 136 has a generally elongate aperture or opening, illustrated at 140, rounded at the ends, which slopes upwardly at an angle, illustrated at 142, which is preferably between about 30 and 60 degrees, for example, 57 degrees. A cylindrical member 144 is received in both of the openings 140, and enlarged heads 146 (large enough to not pass through the respective opening 140) are received on the ends of the member 144 so that the member is inseparable from the members 136 yet is free to move upwardly and downwardly in the openings 140. For example, the cylindrical member 144 and one of the heads 146 may be a bolt, and the other head 146 may be a nut threadedly and tightly received on the bolt and, if desired, welded thereto. The openings 140 are generally aligned with the first plate opening 106.

The cylindrical member or pin 144 (being moved outwardly or generally in a direction away from the terminal end portion 116 as it is moved upwardly) is accordingly generally moved out of the way as the terminal end portion 116 is moved upwardly through the opening 106 (the second plate 108 rotated as appropriate about pin or fulcrum 122). However, like a fish-hook, the cylindrical member or pin 144 is urged inwardly into a groove 132 as it is urged downwardly by gravity to settle into a groove 132, creating a pinching effect to thereby lock or retain the terminal end portion 116 in the opening 106 and thus lock or retain the connector 100 in the closed position illustrated in FIGS. 14 to 17, whereby the supporting cable 24 is connected to the panel 22. In order to release the terminal end portion 116 for movement out of the opening 106 to a connector open position such as illustrated in FIG. 18, the cylindrical member 144 is pulled upwardly in the openings 140 so as to be moved outwardly of the grooves 132 and held there thereby allowing the terminal end portion 116 to be moved downwardly out of the opening 106.

The first portion 118 of the second plate 108 has a generally square or otherwise suitably shaped upwardly extending portion 148 adjacent the second portion 114. This portion 148 has an upwardly sloping notch, illustrated at 150, in its inner edge (edge facing away from the second portion 114).

The terminal free end portion 116 has a generally parallelogram-shaped upwardly extending notch, illustrated at 152, in its inner edge (opposite the grooves 132) adjacent its terminal end.

Referring to FIGS. 19 and 20, in order to provide suitable leverage for manipulating the second plate 108 from the open to closed positions, a crow-bar like tool, illustrated schematically at 154, is provided wherein the terminal end of a portion 156 is received in the notch 150 and wherein, with the tool 154 bearing against the first portion 118 of the second plate 108, force is applied, as illustrated at 158, to another tool portion 160 to rotate the second plate 108 for movement of or to pry the terminal end portion 116 into the opening 106.

When the terminal end portion 116 is moved far enough into the opening 106 for the notch 152 to be above the first plate 102 and accessible to the tool 154, as illustrated in FIG. 20, the terminal end of tool portion 156 is inserted in the notch 152 and, with the tool 154 bearing against the first plate 102, force is applied, as illustrated at 162, to tool portion 160 to rotate the second plate 108 further for movement of the terminal end portion 116 further upwardly, capturing the cylindrical member 144 in a groove 132 to lockingly effectuate a tight connection.

The tool 154 may be similarly used for moving the second plate 108 into position for connecting the panel 22 to the cable 24 in the embodiments (hereinafter discussed) of FIGS. 21 to 25 and of FIGS. 26 to 30.

Referring to FIGS. 21 to 26, there is illustrated generally at 200 a connector having an alternative structure 202 for lockingly retaining the terminal end portion 116 in position connecting the panel 22 to the cable 24. With the exception of the structure 202, the connector 200 is similar to the connector 100.

Structure 202 includes a pair of upstanding outwardly sloping generally flat members 204, which are similar to members 136 and similarly welded or otherwise suitably attached to the first plate 102. Flat members 204 have aligned apertures, illustrated at 206, in which are rotatably received (by means of suitably bearings or otherwise as suitable) a shaft 208. A gear wheel 210 is suitably fixedly received (such as by pins or set screws or other suitable fasteners) centrally on the rotatable shaft 208 and disposed between the flat members 204 for rotation. Alternatively, the shaft 208 may be suitably mounted non-rotatably in the apertures 208 and the gear wheel 210 suitably rotatably mounted on the shaft 208.

The gear wheel 210 has a plurality of gear teeth 212, having suitably chamfered corners 214, in its circumferential periphery around the circumference thereof. The gear wheel 210 is positioned so that the gear teeth 212 mate with and are received in the grooves 132 whereby the rotation of the gear wheel 210 is effected as the terminal end portion 116 is moved upwardly through the slot 106 for connecting the panel 22 to the cable 24.

When the terminal end portion 116 has been moved, as illustrated at 117 in FIG. 26, into a suitable position, such as shown in FIGS. 21 to 24, it is suitably locked in that position (the gear wheel 210 is prevented for rotating) such as by a pin 216 which is receivable in an aperture, illustrated at 218, in one (or both) of the flat members 204 and in one of a series of circumferentially spaced alignable apertures (not shown) in the gear wheel 210. These alignable apertures are preferably spaced entirely around the gear wheel 210 and are preferably equal and similarly spaced to the number of gear teeth 212 so that the gear wheel 210 may be locked in any of various incremental positions thereof. The pin 216 is preferably made inseparable from the other parts of the connector 200 by suitable means such as, for example, a suitable lanyard, illustrated schematically at 220, suitably tied or connected at one end to the pin 216 and at the other end to the first plate 102. The pin 216 may be suitably retained in the locking position by being pinched therein, but other suitable means (such as, for example, a threaded connection of the pin in an aperture 218 or in a gear wheel aperture) may be provided for securing the pin 216 in the locking position against inadvertent removal thereof. In order to remove the pin 216 and release the connection of the cable 24 to the panel 22, the terminal end portion 116 may be pried upwardly slightly to release the pinching force, whereby the pin 216 may then be removed. The pin 216 may, for example, have an enlarged head (not shown) thereon to allow it to be grasped for removal.

Referring to FIGS. 27 to 31, there is illustrated generally at 300 a connector having an alternative structure 302 (instead of members 136 and 144) for lockingly retaining the terminal end portion 116 in position connecting the panel 22 to the cable 24. With the exception of the structure 202 (and elimination of members 136 and 144), the connector 300 is similar to the connector 100.

Structure 302 comprises a generally horseshoe-shaped flat member 304 including a portion 314 having a thickness, illustrated at 306, and further including an enlarged thickness (or increased height) handle portion 308. A groove, illustrated at 310, is provided in its inner edge (opposite the handle 308), defining a pair of spaced prongs 312. The thickness 306 is less than the width of a groove 132 so that the portion 314 is receivable like a wedge between a pair of the teeth 134. The width, illustrated at 316, of the groove 310 is greater than the thickness, illustrated at 318, of the terminal end portion 116 so that the wedge member 304 can be moved into the position illustrated in FIGS. 26 to 29 with the prongs 312 securely straddling the terminal end portion 116 and with the portion 314 received between a pair of the teeth 134 so that the position of the terminal end portion 116 is securely maintained with the member 304 pinched between a tooth 134 and the plate 102. In order to remove the member 304 to disconnect the panel 22 from the cable 24, the pinching force is relieved by pulling or prying up slightly the terminal end portion 116. The member 304 is preferably made inseparable from the other parts of the connector 300 by suitable means such as, for example, a suitable lanyard, illustrated schematically at 320, suitably tied or connected at one end to the member 304 and at the other end to the first plate 102 or, for another example, a suitable slider/track built into the first plate 102 which non-removably receives the wedge 304, with a manual lock at the engaged position.

As used herein and in the claims, the phrase "consisting essentially of a plurality of parts" is intended to refer to all of the parts making up the connector, with the exception of any parts not needed for connector function and with the exception of parts such as pin 216 (FIG. 21) or wedge 302 (FIG. 31) which are easily replaceable staple items of commerce. In this respect, the wedge 70 (FIG. 1) would not normally be considered to be a staple item of commerce since it would normally be specially built for the connector. As may be used herein and in the claims, the phrase "consisting of a plurality of parts" is intended to refer to all of the parts making up the connector, which would include items such as pin 216 (FIG. 21) or wedge 302, with the exception of any parts not needed for connector function. In accordance with the present invention, all of the connector parts (with possibly the above exception, wherein a workman may carry, for example, spare pins 216 around in his pocket) are assembled so that they are not lost one from the other as work is being performed high on bridge platforms or other scaffolding.

Referring to FIGS. 32 to 36, there is illustrated generally at 420 an alternative embodiment of a connector with the neck portion 416 to provide greater access to the cable 24 for attaching it to one or more deck panels 22 so that the attachment may be performed more easily and quickly. While only one deck panel 22 is shown in FIGS. 32 and 33 for ease of illustration, it should of course be understood that a plurality such as 4 such deck panels may be connected to a cable 24, such as illustrated in FIG. 38.

The connector 420, composed of steel or other suitable material, comprises first and second parts 424 and 422 respectively which include generally rectangular flat plates 428 and 426 respectively which, when in position attaching cable 24 to the deck panels 22, abut along edges 432 and 430 respectively to together overlie (preferably both width-wise and length-wise) the deck panel opening 26. For uniformity, the plates 426 and 428 are preferably of the same thickness and width, which may, for example, be about ¼ inch and about 1½ inch respectively. First and second plates 428 and 426 respectively may have lengths of, for example, about 3 inches and about 1½ inch respectively. First plate 428 may have a width and length of, for example, about 3 inches and about 6½ inches respectively.

When in position attaching the cable 24 to the deck panels 22, as seen in FIGS. 32 and 33, the first and second plates 428 and 426 respectively have end edges 432 and 430 respectively which abut and face each other. Each of the first and second plates 428 and 426 respectively has a slot or notch, illustrated at 436 and 434 respectively centrally of its facing edge 432 and 430 respectively so that the notches are in alignment, notch 436 being rectangular and notch 434 being generally rectangular with a domed inner end. Each notch 434 and 436 may have a length of, for example, about 1 inch. Notches 434 and 436 may have widths of, for example, about 9/16 inch and about ⅝ inch respectively.

A rectangular plate 438 is welded or otherwise suitably attached to the upper surface of first plate 428 and extends beyond the facing edge 432 in order to provide a seal against debris falling through cracks. First plate 428 has an aperture, illustrated at 440, centrally of the width thereof. The aperture 440 may have a diameter of, for example, about 9/16 inch, and its center may be located from notch 436 a distance of, for example, about 1¾ inch.

Second part 422 includes a U-shaped or generally arcuate portion 452 (corresponds to portion 414 in FIG. 38) sized and shaped and attachable to plate portion 426 (as discussed hereinafter) to be translatable through and to extend downwardly from the deck panel slots 26 then upwardly with its terminal end portion 444, which is threaded as illustrated by threads 446, passing through aperture 440. The U-shaped portion 442 is sized to receive cable 24 between the U-shaped portion 442 (i.e., cradled between the legs 460 and 462 thereof) and the second plate 428. A suitable nut 448 (for example, a ½ inch hex full nut) is suitably applied to the threads 444 of the threaded terminal end portion 456 thereby to securely attach the cable 24 to the deck panels 22.

While the neck portion 416 could be formed as part of the plate portion 426 by notching corners at one end of the plate portion 426 to form a reduced width portion to serve as the neck portion, it is preferred that the neck portion 416 be formed as described below (formed of round bar or otherwise formed to be circular in cross-section) in order to provide greater strength.

The neck portion 416 (defined by the length 417 in FIG. 34) is part of a longer portion which is interposed between and attaches the U-shaped portion 442 to the first plate portion 426, as discussed hereinafter. Thus, an extension portion 464, having the same diameter as neck portion 416, extends from the neck portion 416 to extend to and abut the inner end of the notch 434 where it is fixedly attached such as by welding. The portions 416, 442, and 464 may be composed, for example, of ½ inch round bar wherein these portions are welded together as at welds illustrated at 450. Thus a U-shaped portion 452 may, for example, be bent to be radiused at 1½ inch and one end welded to portion 454 (for example, radiused at ¼ inch) and the other end welded to threaded terminal end portion 456 (which may have a length, for example, of 1½ inch). The portion 454 may be welded to the portion comprising portions 416 and 464. It should of course be understood that these portions may be otherwise suitably sized and shaped in a manner which allows the neck portion 416 and the U-shaped portion 452 to be translated through the deck panel slots 26 (with the plate portion 426 having a width to prevent its passage therethrough and instead to allow it to cover the deck panel slots 26).

The portion 416 extends generally perpendicular or normal to the leg 460 of the U-shaped portion 452. The portion 464 may have a length of, for example, about 1 inch, and the neck portion length may, for example, be about ½ inch (or up to about 1 inch, as desired). Since the diameter of the combined extension and neck portions, as illustrated in FIG. 35, is about twice the thickness of the plate portion 426, it can be seen in FIGS. 33 and 35 that the lower part of the combined extension and neck portions 464 and 416 respectively extends below the plate portion 426. When the plate portions are disposed in the connecting relationship shown in FIGS. 32 and 33, the neck portion 416 is received in the first plate slot 436. Thus, the neck portion 416, like the plate portion 426, extends generally along or over the panel or panels 22 and is thus said to extend in a direction lengthwise of the plate portion 426.

In order to attach the cable 24 to the deck panels 22, the U-shaped and neck portions 452 (or 414) and 416 respectively of the second part 422 are passed (translated) downwardly through the deck panel openings 26, as illustrated in FIG. 38, the neck portion 416 suspending the U-shaped portion 452 (or 414) below the deck panels 22 by the distance generally indicated at 417 thereby to make the connection easier and quicker. The second part 422 is manipulated to receive the cable 24 after which the terminal end portion 456 of the U-shaped portion 452 is inserted through the first plate aperture 440 and, with the plate portions 426 and 428 abutting and together overlying the deck panel openings 26, as illustrated in FIGS. 32 and 33, the nut 448 applied thereby to easily and quickly secure the cable 24 to the deck panels 22. The neck portion 416 of the embodiments of FIGS. 14 to 31 is also translatable through the deck panel openings to similarly suspend the corresponding U-shaped portion below the deck panels 22 by the distance generally indicated at 417 thereby to also make the connection easier and quicker.

It should be understood that, while the present invention has been described in detail herein, the invention can be embodied otherwise without departing from the principles thereof. For example, there may be suitable alternative embodiments to structure 136, 144, 146 and structures 202 and 302 for locking the terminal end portion 116 position, and the neck portion 416 and U-shaped portion may be otherwise suitably embodied. For another example, a neck portion similar to neck portion 416 (FIGS. 32 to 35) may be provided to connect the U-shaped portion 32 to the plate 28 of the connector 20 of FIGS. 1 to 13 so that the U-shaped portion 32, like the U-shaped portion 442, may be suspended at a distance below the deck panels 22 to similarly make the connection easier and quicker. Such other embodiments are meant to come within the scope of the present invention as defined by the appended claims.

What is claimed is:

1. A connector for connecting and disconnecting of at least one panel to and from a supporting cable, the connector comprising:

first and second parts having first and second plates respectively;

said first and second plates having edges respectively which abut each other when the at least one panel is connected to the supporting cable by the connector;

said first and second plates being sized to together overlie an opening in the at least one panel with said edges abutting each other;

an aperture in said first plate;

a first slot extending into said first plate from said edge of said first plate;

a second slot extending into said second plate from said edge of said second plate;

said first and second slots being alignable when said first and second edges abut each other;

said second part including an elongate member having a first portion which is disposed in said second slot and which extends from said second slot beyond said edge of said second plate a predetermined distance to define a neck portion;

said elongate member further having a generally arcuate second portion having a terminal end portion and sized and shaped for being positioned, when said first and second parts connect the at least one panel to the supporting cable, to extend from an end of said neck portion away from said first plate then toward said first plate, with said terminal end portion being received through said aperture in said first plate, whereby said second part can be manipulated to receive the underlying cable between said generally arcuate second portion and the at least one panel and to then pass said terminal end portion through said aperture in said first plate to define a closed position of the connector;

whereby said second part can be manipulated between first and second orientations for connecting of the at least one panel to the supporting cable;

wherein in said first orientation of said second part, said second plate and said neck portion extend generally vertically with said neck portion extending generally vertically below said first plate to allow ease of manipulation of said second part to receive the cable between said arcuate second portion and the at least one panel;

wherein, in said second orientation of said second part, said neck portion extends generally horizontally within said slot in said first plate when said second part is manipulated into said closed position; and wherein said terminal end portion is threaded to receive a nut.

2. A connector according to claim 1 wherein said neck portion has a length of between about one-half inch and about 1 inch.

3. A connector according to claim 1 wherein said first part further includes another plate overlying and attached to said first plate and extending beyond said edge of said first plate to cover the abutment of said edges of said first and second plates.

4. A connector according to claim 1 wherein said elongate member is circular in cross-section.

5. A platform comprising:
- a plurality of generally parallel cables;
- a plurality of panels resting on and supported by said cables and having openings therein;
- and a plurality of connectors for connecting and disconnecting ones of said panels to and from ones of said supporting cables;
- at least one of said connectors comprising first and second parts having first and second plates respectively;
- said first and second plates having edges respectively which can abut each other;
- said first and second plates together overlying said opening in one of said panels with said edges abutting each other,
- an aperture in said first plate;
- a first slot extending into said first plate from said edge of said first plate;
- a second slot extending into said second plate from said edge of said second plate;
- said first and second slots being aligned;
- said second part including an elongate member having a first portion which is disposed in said second slot and which extends beyond said edge of said second plate a predetermined distance to define a neck portion;
- said elongate member further having a generally arcuate second portion having a terminal end portion;
- wherein said elongate member extends from an end of said neck portion away from said first plate then toward said first plate with said terminal end portion being received through said aperture in said first plate and with one of said cables received between said generally arcuate second portion and said one of said panels;
- wherein said neck portion extends generally horizontally within said slot in said first plate;
- wherein said terminal end portion is threaded; and
- said connector further comprises a nut threadedly received on said terminal end portion.

6. A platform according to claim 5 wherein said neck portion has a length of between about one-half inch and about 1 inch.

7. A platform according to claim 5 wherein said first part further includes another plate overlying and attached to said first plate and extending beyond said edge of said first plate to cover the abutment of said edges of said first and second plates.

8. A platform according to claim 5 wherein said elongate member is circular in cross-section.

9. A method of connecting at least one panel to a supporting cable comprising the steps of:
- a) providing a connector which comprises a first part including a first plate having a slot extending into the first plate from an edge thereof;
- b) providing the connector to comprise a second part including a second plate having a slot extending into the second plate from an edge thereof, the second part further including an elongate member having a first portion which is disposed in the second slot and which extends beyond the edge of the second plate a predetermined distance to define a neck portion, the elongate member further having a generally arcuate second portion and a threaded terminal end portion;
- c) orienting the second plate and the neck portion generally vertically and inserting the generally arcuate second portion, the terminal end portion, and the neck portion through an opening in the at least one panel;
- d) manipulating the second part so that the cable is received between the generally arcuate second portion and the at least one panel;
- e) orienting the second plate and the neck portion generally horizontally so that the edge of the second plate abuts the edge of the first plate and so that the neck portion is received in the slot of the first plate, and with the abutting first and second plates together covering the opening in the at least one panel, and inserting the threaded terminal end portion in an aperture in the first plate; and
- f) threadedly receiving a nut on the threaded terminal end portion.

10. A method according to claim 9 further comprising selecting the length of said neck portion to be between about one-half inch and about 1 inch.

11. A method according to claim 9 further comprising selecting said first part to further include another plate overlying and attached to the first plate and extending beyond the edge of the first plate to cover the abutment of the edges of the first and second plates.

12. A method according to claim 9 further comprising selecting said elongate member to be circular in cross-section.

* * * * *